(12) United States Patent
Kondo (10) Patent No.: US 9,280,317 B2
(45) Date of Patent: Mar. 8, 2016

(54) SEMICONDUCTOR MEMORY DEVICE AND RANDOM NUMBER GENERATOR

(71) Applicant: Kabushiki Kaisha Toshiba, Minato-ku (JP)

(72) Inventor: Yosuke Kondo, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 287 days.

(21) Appl. No.: 13/945,186

(22) Filed: Jul. 18, 2013

(65) Prior Publication Data

US 2014/0337395 A1 Nov. 13, 2014

(30) Foreign Application Priority Data

May 13, 2013 (JP) ................................. 2013-101302

(51) Int. Cl.
*G06F 7/58* (2006.01)
(52) U.S. Cl.
CPC ....................................... *G06F 7/584* (2013.01)
(58) Field of Classification Search
CPC .................................. G06F 7/584; G06F 7/58
USPC ......................................... 708/209, 250–256
See application file for complete search history.

(56) References Cited

U.S. PATENT DOCUMENTS

| | | | | |
|---|---|---|---|---|
| 5,060,265 A * | 10/1991 | Finkelstein | ..................... | 380/46 |
| 6,668,265 B1 | 12/2003 | Umeno | | |
| 7,257,608 B2 | 8/2007 | Umeno | | |
| 7,512,645 B2 * | 3/2009 | Pitz et al. | ....................... | 708/250 |
| 7,895,251 B2 | 2/2011 | Ishikawa | | |
| 2006/0064448 A1 * | 3/2006 | Henry et al. | ................... | 708/250 |
| 2011/0119321 A1 | 5/2011 | Ishikawa | | |
| 2014/0032623 A1 * | 1/2014 | Lablans | ......................... | 708/252 |
| 2014/0164458 A1 * | 6/2014 | Tkacik et al. | ................. | 708/250 |

FOREIGN PATENT DOCUMENTS

| | | |
|---|---|---|
| JP | 2001-175168 | 6/2001 |
| JP | 2005-352904 | 12/2005 |
| JP | 2012-216154 | 11/2012 |

\* cited by examiner

*Primary Examiner* — Chuong D Ngo (74) *Attorney, Agent, or Firm* — Oblon, McClelland, Maier & Neustadt, L.L.P.

(57) ABSTRACT

According to one embodiment, semiconductor memory device and a random number generator includes A semiconductor memory device includes: a semiconductor memory 30, a random number generator 10 generating a random number sequence, and a data writing unit 20 storing data in the semiconductor memory 30 using the random number sequence. The random number generator 10 includes: a random number generating unit generating an M-bit random number sequence; a coefficient selecting unit outputs a first coefficient or a second coefficient to the random number generating unit; and a bit selecting unit which outputs the random number sequence obtained by selecting N bits from M-bit random number sequence output from the random number generating unit.

16 Claims, 3 Drawing Sheets

SEMICONDUCTOR MEMORY DEVICE AND RANDOM NUMBER GENERATOR

CROSS-REFERENCE TO RELATED APPLICATIONS

This application is based upon and claims the benefit of priority from Japanese Patent Application No. 2013-101302, filed on May 13, 2013; the entire contents of which are incorporated herein by reference.

FIELD

Embodiments described herein relate generally to a semiconductor memory device and a random number generator.

BACKGROUND

Conventionally, a random number sequence obtained from a simple random number algorithm, such as M-sequence, has high randomness in a one-dimensional direction. When R number of one-dimensional random number sequences each having C number of elements are prepared while their initial values are varied and the sequences are arranged in a two-dimensional manner like R×C, if the Hamming distance between the initial values in the adjacent rows is small, the obtained random number sequences are in correlation and the numbers in the random number sequence in the column direction are biased to 0 or 1. In some cases, all of the R number of sequences are 0 or 1, which results in poor randomness.

However, in a conventional technique, when the randomness is increased in the two-dimensional arrangement, a problem occurs in that the circuit scale is increased.

DETAILED DESCRIPTION

In general, according to one embodiment, semiconductor memory device and a random number generator includes A semiconductor memory device of an embodiment according to the present invention includes: a semiconductor memory; a random number generator generate a random number sequence used for storing data in the semiconductor memory; and a data writing unit store the data in the semiconductor memory using the random number sequence generated by the random number generator. The random number generator includes a random number generating unit including M (M is a positive integer) number of shift registers, having a feedback loop for a part of the M shift registers, and generating an M-bit random number sequence. The random number generator moreover includes a coefficient selecting unit which, if the generation of the random number sequence in the random number generating unit is started, selects one of a plurality of first coefficient groups for activating or deactivating the feedback loop on the basis of a first value and outputs the selected one to the random number generating unit, and which, if the generation of the random number sequence in the random number generating unit is continued, outputs a second coefficient different from the first coefficient and for activating or deactivating the feedback loop to the random number generating unit. In addition, the random number generator includes a bit selecting unit which selects one from a plurality of selection patterns based on a second value, which is different from the first value, and outputs a random number sequence obtained by selecting N (N is a positive integer satisfying M≥N) bits from the M-bit random number sequence output from the random number generating unit in accordance with the selected selection pattern.

Exemplary embodiments of semiconductor memory device and a random number generator will be explained below in detail with reference to the accompanying drawings. The present invention is not limited to the following embodiments.

First Embodiment

Figure 1:
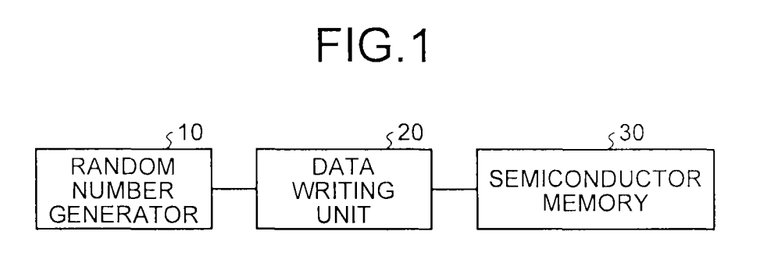
FIG. 1 is a diagram showing a configuration example of a semiconductor memory device according to a first embodiment.

FIG. 1 is a diagram depicting a configuration example of a semiconductor memory device according to a first embodiment. The semiconductor memory device includes a random number generator 10, a data writing unit 20, and a semiconductor memory 30. The random number generator 10 generates random numbers used when the data writing unit 20 writes (stores) data in the semiconductor memory 30. The data writing unit 20 writes the data in the semiconductor memory 30 using the random numbers generated by the random number generator 10. The semiconductor memory 30 is a memory (storage unit) for storing the data.

Figure 2:
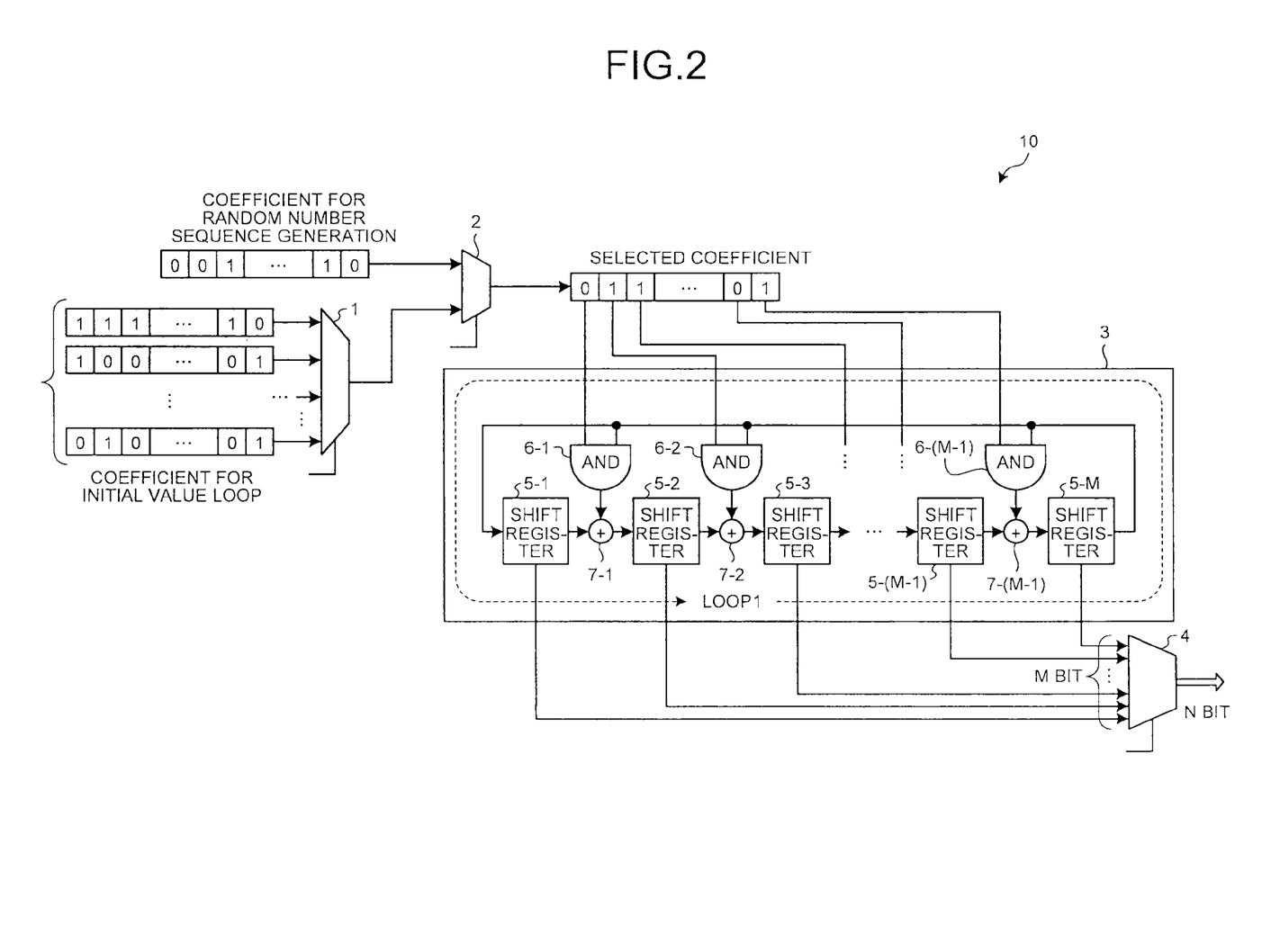
FIG. 2 is a diagram showing a configuration example of a random number generator according to the first embodiment.

Next, the detailed description is made of the operation of the random number generator 10 capable of generating, when a plurality of random number sequences with no bias to 0 or 1 in the random number sequence as described in the background art is used, the random number sequences with high randomness. The random number generator is used in various fields, and as one example, this first embodiment describes the operation of the random number generator 10 mounted in a semiconductor memory device. That is, in the first embodiment, the data as the sequence corresponding to the target to be randomized (random number generation) in the random number generator 10 are the data to be recorded in the semiconductor memory 30 included in the semiconductor memory device (hereinafter, the data are also referred to as recorded data). Note that the intended purpose of the random number generator 10 in the description below is not limited to the semiconductor memory device. In other purposes, the random number generator 10 can randomize the data other than the recorded data. FIG. 2 is a diagram depicting a configuration example of the random number generator according to the first embodiment. The random number generator 10 includes a selector 1, a selector 2, a random number generating unit 3, and a selector 4.

The random number generating unit 3 includes: M (M is a positive integer) stages of shift registers 5-1 to 5-M; (M−1) number of AND operation units (ANDS) 6-1 to 6-(M−1) for the second and subsequent shift registers 5-2 to 5-M; and (M−1) number of exclusive OR operation units (EX-ORs) 7-1 to 7-(M−1) for the second and subsequent shift registers 5-2 to 5-M. For every clock, the random number generating unit 3 outputs M-bit random number sequences including the values output from the M stages of shift registers 5-1 to 5-M.

The random number generating unit 3 has, on the input side of the shift registers 5-2 to 5-M among the M stages of shift registers 5-1 to 5-M, feedback loops that extend via the AND operation units 6-1 to 6-(M−1) and the exclusive OR operation units 7-1 to 7-(M−1). Whether each feedback loop is active or not depends on the result of the operation (AND) of the AND operation units 6-1 to 6-(M−1), specifically on the logic operation (AND) of each bit value ("0" or "1") of the selected coefficient and the output value of the shift register 5-M. Here, the selected coefficient refers to the coefficient of the M−1 bits, and to the coefficient for the random number sequence generation or the coefficient for the initial value loop. In each of the shift registers 5-2 to 5-M, the input value is the value obtained as a result of the operation (EX-OR) of the exclusive OR operation units 7-1 to 7-(M−1), specifically the value obtained from the logic operation (EX-OR) of the output values from the AND operation units 6-1 to 6-(M−1) and the output values from the shift registers 5-1 to 5-(M−1) in the previous stage. In the shift register 5-1, the value output from the shift register 5-M is the input value.

The coefficient for the random number sequence generation is the primitive polynomial of the M-sequence, and is the information to be the connection information of the feedback loop relative to the output of the shift registers 5-1 to 5-(M−1) in the 1st to (M−1)-th stages at the time of generating the random number sequence.

The coefficient for the initial value loop is the information to be the connection information of each feedback loop for providing the initial value used at the time of generating the random number sequence on the basis of the address value of the semiconductor memory 30 in which the recorded data serving as the sequence to be randomized (here, row or column when the recorded data in the semiconductor memory 30 are developed in the two-dimensional direction for each address) is recorded. The coefficient for the initial value loop is preferably the coefficient different from the coefficient for the random number sequence generation.

Here, the reason why the initial value is obtained by bit-shifting the address value using the selected coefficient is because the value is set as far as possible from the original value (address value). Moreover, the reason why the plural coefficients (coefficients for the initial value loop) are prepared in addition to the coefficient for the random number sequence generation is because the correlation between the coefficients is made as small as possible by increasing the Hamming distance between the adjacent initial values.

For example, the case in which the random number sequence is generated for every row is considered. As for the frequency of "0" in the random number sequence in the column direction when the same value is used as the coefficients for the initial value loop, the numbers in one column are biased to 0, in which case the randomness is poor in some data patterns. These results are obtained from experiments. Therefore, the random number generator 10 includes the selector 1 for varying the coefficient in accordance with the given address value. Note that the coefficient for the initial value loop is not necessarily the primitive polynomial and the number of times of bit shifts (number of times of LOOP1) may also be determined in accordance with the number of stages of the shift registers and the operation frequency of the system. The number of times is preferably determined so that the bit shift is performed less as the number of the shift registers is larger or the operation frequency of the system is higher.

The selector 1 allocates the lower three bits of the address value of the recorded data, which are the sequence to be randomized (for example, row or column), to the prepared plural coefficients for the initial value loop (plural first coefficient groups), and selects one of the plural coefficients for the initial value loop. In this case, $2^3=8$ patterns of the coefficients for the initial value loop, specifically, a table storing the eight patterns of the coefficients for the initial value loop is prepared. The preparation for the eight patterns of the coefficients for the initial value loop is just an example, and in another example, when the lower four bits of the address value are allocated, $2^4=16$ patterns of the coefficients for the initial value loop are prepared.

In the random number generating unit 3, the selector 2 selects the coefficient to be output, depending on whether the bit shift is performed for obtaining the initial value or for generating the actual random number sequence. The selector 2 normally outputs the coefficient for the random number sequence generation (second coefficient) as the selected coefficient, and when it is necessary to obtain the initial value again by switching the address value of the recorded data to be randomized, outputs the coefficient from the selector 1 side as the selected coefficient. In the selector 2, the coefficient for the random number sequence generation, specifically, a table storing the coefficient for the random number sequence generation is prepared. In other words, the selector 1 and the selector 2 constitute the coefficient selecting unit outputting the coefficients to the random number generating unit 3.

When the initial value is obtained by the bit-shifting with the separate coefficients in accordance with the address value of the recorded data to be randomized, the correlation among the random number sequences obtained from the adjacent initial values is reduced. However, when the value from the random number generating unit 3 is used as the random number sequence without any change, the numbers in the random number sequence in the column direction are biased to 0 or 1, like when the coefficient for the bit shifting for obtaining the initial value is not changed. In this case, the randomness becomes poor in some data patterns.

The case is assumed in which the random number sequence is generated for every row, like the case in which the same value is used as every coefficient for the initial value loop. As for the frequency of 0 in the random number sequence in the column direction when the values of the shift registers 5-1 to 5-M in the random number generating unit 3 are used without any change as the output of the random number sequence, the numbers are biased to 0 in one column and the randomness is poor in some data patterns. These results are obtained from experiments. Therefore, the random number generator 10 includes the selector 4 for obtaining the random number sequence of N bits from the M-bit value of the random number generating unit 3.

The selector 4 selects (extracts) the value corresponding to N (N is a positive integer satisfying M≥N) bits in accordance with a part of the address value, for example, from the M-bit sequence output from the shift registers 5-1 to 5-M of the random number generating unit 3, and outputs the value as the N-bit random number sequence. In other words, the selector 4 is a bit selecting unit for changing the allocation of the bit of the random number sequence. Here, the part of the address value is the value (second value) using three bits, which is different from the value (first value) using three bits used in the selector 1, among the address value. The bit different from the bit used in the selector 1 is used in order to reduce the correlation among the random number coefficients output from the selector 4. Thus, the number of selection patterns of the bit for selecting the value for N bits from the M-bit sequence output from the shift registers 5-1 to 5-M of the random number generating unit 3 can be set $2^3=8$ patterns in the selector 4. Note that the preparation of the eight patterns is just an example, and in another example, $2^4=16$ patterns of selection patterns are prepared when four bits of the address value are allocated.

Figure 3:
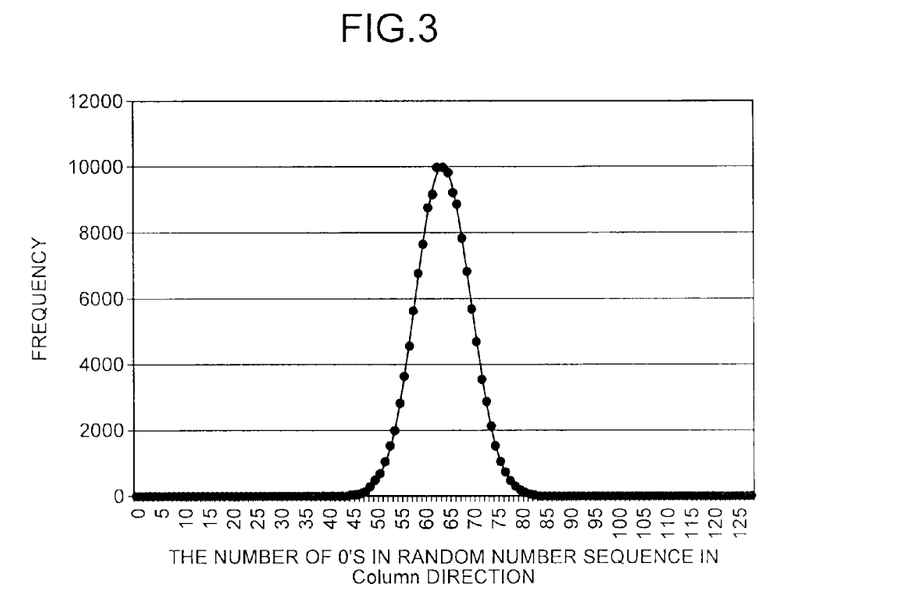
FIG. 3 is a diagram showing a number of 0's in the random number sequence in the column direction when the random number generator according to the first embodiment is used.

The random number sequence obtained thus is the random sequence both in the row and column directions, and the number of 0's or 1's in the random number sequence in each column direction becomes Gaussian distribution as depicted in FIG. 3. Thus, the randomness is high not depending on the data pattern. FIG. 3 is the graph expressing the number of 0's in the random number sequence in the column direction when the random number generator of the first embodiment is used. The number 0 appears with the frequency according to the Gaussian distribution, unlike when the same value is used as the coefficients for the initial value loop or when the values of the shift registers 5-1 to 5-M of the random number generating unit 3 are used without any change as the output of the random number sequence. These results are obtained from experiments.

Therefore, the random number generator 10 having high randomness in the two-dimensional direction can be achieved by a very small-scaled circuit mainly including the M-sequence shift registers, the three selectors, and the two tables.

Next, the operation of the random number generator 10 for outputting the random number sequence is specifically described. Here, as an example, the case of generating the random number sequence for every row is described. Note that the similar operation is applicable when the random number sequence on the column is generated.

First, the coefficient for the random number sequence generation for the selector 2 and the coefficient for the initial value loop for the selector 1 are prepared in the random number generator 10 as the preliminary preparation for the generation of the random number sequence. The coefficient for the random number generation is the primitive polynomial of M-sequence and can be determined uniquely. As for the coefficient for the initial value loop, the eight patterns are prepared so that the coefficients are different in the lower three bits of the address value in the above example. The coefficients for the initial value loop which do not correlate with each other are used as the eight patterns or the coefficients for the initial value loop.

Next, the random number generator 10 initializes the random number generating unit 3. The random number generating unit 3 sets the address value of the recorded data of the sequence to be randomized (here, one row) to the shift registers 5-1 to 5-M. Here, the selector 1 selects and outputs one of the eight patterns of the coefficients for the initial value loop on the basis of the lower three bits of the address value. The selector 2 selects the coefficient for the initial value loop from the selector 1, and outputs the coefficient as the information of the connection of the feedback loop of the random number generating unit 3. Then, the random number generating unit 3 bit-shifts the address values set to the shift registers 5-1 to 5-M using the coefficients for the initial value loop, and uses the value as the initial value, the value having been looped several times. The number of times of the loops can be arbitrarily set.

In the random number generator 10, upon the setting of the initial value to the shift registers 5-1 to 5-M of the random number generating unit 3, the selector 2 switches the coefficients to be output, from the coefficients for the initial value loop from the selector 1 to the coefficients for the random number sequence generation in order to actually generate the random number sequence. The random number generating unit 3 sets the coefficients for the random number sequence generation as the information of the connection of the feedback loop. Then, the random number generating unit 3 bit-shifts the initial value a predetermined number of times using the coefficients for the random number sequence generation, and outputs the generated random number sequence. On this occasion, the output from the shift registers 5-1 to 5-M of the random number generating unit 3 has M bits. Upon the input of the M bits from the shift registers 5-1 to 5-M of the random number generating unit 3, the selector 4 determines the selection pattern using the three bits different from the three bits of the address value used in the selector 1, and outputs the N bits on the basis of the determined selection pattern.

In the random number generator 10, if the random number sequence of the row is generated, the shift at the shift registers 5-1 to 5-M in the random number generating unit 3 is repeated a predetermined number of times so as to output the bit corresponding to the bit of the column from the selector 4. The predetermined number of times needs to be, for example, if the column number is 128 bits, the output from the shift registers 5-1 to 5-M of the random number generating unit 3 to the selector 4 is 32 bits, and the output from the selector 4 after the selection is 16 bits, 128/16=8 times from the selector 4 in order to output 128 bits from the random number generator 10. Therefore, the shift registers of the random number generating unit 3 perform the shift at least eight times.

In the random number generator 10, after the random number sequence corresponding to the number of columns is generated for one row, the process is performed for generating the random number for the next row. Here, the information in the shift register used in the calculation of the previous row is initialized by setting the address value of the recorded data of the sequence to be randomized next (row) to the shift register of the random number generating unit 3. The subsequent operation in the random number generator 10 is similar to the aforementioned operation. Then, the random number generator 10 repeatedly performs the operation for generating the random number sequence by the number of times corresponding to the number of rows. As a result, the random number generator 10 can provide the random number sequence with high randomness in the two-dimensional random number arrangement.

Note that although the random number generator 10 according to the first embodiment generates the random number sequence of one row and then generates the random number sequence for the next row, this is just an example and the present invention is not limited to this. For example, in the random number generator 10, the row for generating the random number may be switched per unit output from the selector 4 so that after the random number sequence corresponding to the output from the selector 4 on a certain row is output, the random number sequence on another row is generated and output.

In the semiconductor memory device, the concentration of the memory of the data pattern on particular recorded data is prevented by writing the recorded data in the semiconductor memory 30 with the data writing unit 20 using the random number sequence obtained in the random number generator 10; specifically, the correlation among the bit values of the adjacent cells can be eliminated even when the sequences of the recorded data have the correlation.

As thus described, in the first embodiment, the random number generator generates the initial value used for random number generation by selecting one of the plural coefficients for the initial value loop on the basis of the address value of the recorded data to be randomized, and the shifting is performed with the coefficients for the random number sequence generation relative to the generated initial value, thereby generating the M-bit random number sequence. Then, the N-bit sequence selected from the generated M-bit random number sequence is used as the random number sequence. This results in the advantageous effects that, when plural random number sequences are used, the random number sequences with high randomness among the random number sequences can be generated while the circuit scale is reduced.

Second Embodiment

In the first embodiment, the random number generating unit 3 of the random number generator 10 includes (M−1) number of AND operation units (ANDS) 6-1 to 6-(M−1) and (M−1) number of exclusive OR operation units (EX-ORs) 7-1 to 7-(M−1). Thus, any value may be applicable as the coefficients for the random number sequence generation and the coefficients for the initial value loop. As a result, if all the coefficients for the random number sequence generation and the coefficients for the initial value loop prepared have the bit position without "1", the feedback loop, the AND operation unit (AND) and the exclusive OR operation unit (EX-OR) for that bit position need not to be set as the circuit configurations in the random number generating unit 3.

Thus, the circuit scale can be further reduced while achieving the similar effect to the first embodiment.

Third Embodiment

In the first embodiment, the coefficients for the random number sequence generation and the coefficients for the initial value loop are prepared as the coefficients; however, the primitive polynomial of the coefficients for the random number sequence generation may be used in accordance with the address value instead of the coefficients for the initial value loop. Specifically, in FIG. 2, the selector 1 and the coefficients for the initial value loop prepared for the selector 1 are not provided, and in the case of the first embodiment, eight patterns of the coefficients are prepared as an alternative to the coefficients for the initial value loop in the selector 2. In other words, if the initial value is obtained from the random number generating unit 3, the selector 2 outputs the coefficient used as the alternative to the coefficient for the initial value loop on the basis of the lower three bits of the address value. The selector 2 outputs the original coefficient for the random number sequence generation if the random number sequence is actually generated in the random number generating unit 3. In the first embodiment, the coefficient selecting unit includes the two selectors; however, the coefficient selecting unit includes one selector in the third embodiment.

Thus, the circuit scale can be further reduced while the similar effect to that of the first embodiment can be obtained because the number of the selectors can be reduced.

Fourth Embodiment

Figure 4:
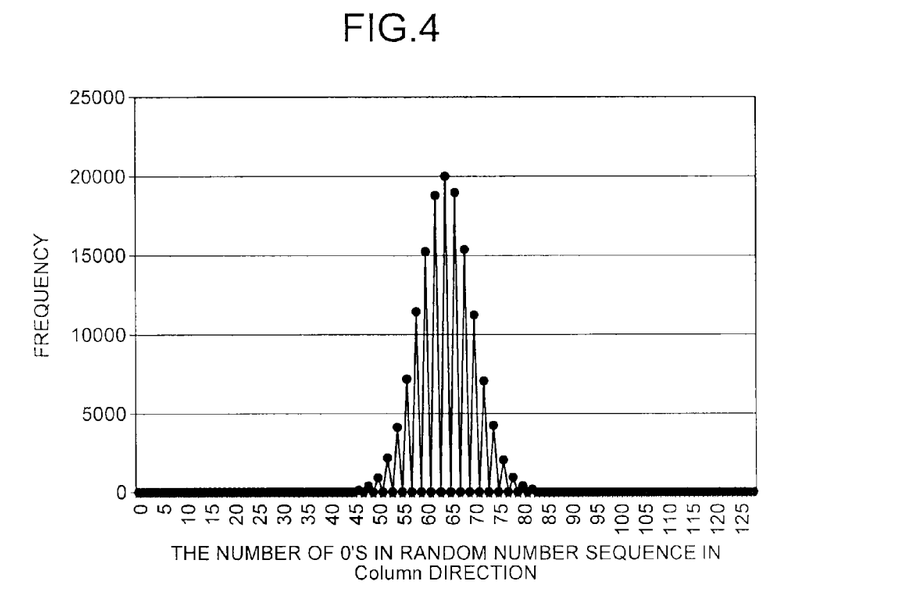
FIG. 4 is a diagram showing a number of 0's in the random number sequence in the column direction when the coefficients for the initial value loop are reduced in a fourth embodiment.

In the first embodiment, the eight patterns of the coefficients for the initial value loop are prepared for the selector 1 and the eight patterns of the selection methods for the output of the N bits are prepared for the selector 4. Thus, the number of 0's in the random number sequence in column can be made Gaussian distribution as expressed in FIG. 3. Here, for example, when four patterns of the coefficients for the initial value loop are employed, the Gaussian distribution is disturbed as depicted in FIG. 4. FIG. 4 depicts the number of 0's in the random number sequence in the column direction in the case where the coefficients for the initial value loop are reduced in the fourth embodiment. The Gaussian distribution is similarly disturbed even when the selection patterns of the output of the selector 4 are reduced. These results are obtained from experiments. Thus, the number of patterns of the coefficients and the selection methods of the output is preferably eight or more.

The present invention is not limited thereto in some of the systems. For example, the number of coefficients for the initial value loop and the number of selection patterns can be reduced if, although the number of coefficients for the initial value loop in the selector 1 and the number of selection patterns in the selector 4 are reduced, the random number sequence output from the selector 4 satisfies the desired randomness.

Fifth Embodiment

In the first embodiment, the random number sequence with high randomness in the two-dimensional direction is generated; however, the random number generator 10 may generate the random number sequence with high randomness including another element. For example, in the case of using the random number generator 10 for the semiconductor memory device, the random number sequence can be generated in accordance with the access frequencies for data writing.

In this case, in the random number generator 10 depicted in FIG. 2, $2^3=8$ coefficients for the initial value loop for the access frequencies relative to each coefficient for the initial value loop are prepared in addition to the eight coefficients for the initial value loop relative to the lower three bits of the address value in the selector 1 (8×8=64 patterns in total). Similarly, in the selector 4, $2^3=8$ selection patterns are prepared for the access frequencies relative to each selection pattern in addition to the eight selection patterns for the three bits of the address value (8×8=64 patterns in total).

Thus, in the semiconductor memory device, the random number sequence with high randomness can be generated with respect to another element such as the access frequencies in addition to generating the random number sequence with high randomness in the two-dimensional directions.

Note that as described in the first embodiment, the random number generator 10 is applicable to the purposes other than the semiconductor memory device, and the similar operation to the fifth embodiment is applicable even when the random number generator 10 is applied to the other purposes than the semiconductor memory device. In other words, if the sequence as the target of the random number sequence generation is added in the purpose other than the semiconductor memory device, the selector 1 in the random number generator 10 selects and outputs one from the first coefficients more than the first coefficient groups (corresponding to the coefficients for the initial value loop in the semiconductor memory device) before the addition. Further, the selector 4 selects the value corresponding to N bits and outputs the random number sequence in accordance with one selection pattern selected from the selection patterns more than the selection patterns before the addition. Even in this case, the random number generator 10 can generate the random number sequence with high randomness.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
a semiconductor memory;
a random number generator configured to generate, when storing data in the semiconductor memory, a random number sequence for randomizing the data using an address value of the data to be stored in the semiconductor memory; and
a data writing circuit configured to store, in the semiconductor memory, the randomized data using the random number sequence generated by the random number generator, the random number generator including
M (M is a positive integer) number of shift registers, having a feedback loop for a part of the M shift registers, and generating an M-bit random number sequence,
a coefficient selecting circuit that, when generation of the random number sequence in the random number generator is started, selects, on the basis of a first value, one of a plurality of first coefficient groups for activating or deactivating the feedback loop and outputs the selected one of the plurality of first coefficient groups as a first coefficient to the random number generator, and that, when the generation of the random number sequence in the random number generator is continued, outputs a second coefficient different from the first coefficient, the second coefficient being for activating or deactivating the feedback loop, the first value being generated from a group of bits of the address value of the data to be stored in the semiconductor memory, and
a bit selecting circuit that selects one from a plurality of selection patterns on the basis of a second value that is generated from, among the address value of the data to be stored in the semiconductor memory, a group of bits different from the group of bits from which the first value is generated, and that outputs a random number sequence obtained by selecting N (N is a positive integer satisfying M≥N) bits from the M-bit random number sequence output from the random number generator in accordance with the selected selection pattern.

2. The semiconductor memory device of claim 1, wherein:
the first value is a value that is generated, when a number of the first coefficient groups is two to an X-th power (X is a positive integer), using an X number of bits among the address value of the data; and
the second value is a value that is generated, when a number of the second coefficient groups is two to a Y-th power (Y is a positive integer), using a Y number of bits among the address value of the data, the Y number of bits being different from the X number of bits.

3. The semiconductor memory device of claim 2, wherein, when a bit position with a value of 0 exists in both the first coefficient and the second coefficient, the random number generator does not set the feedback loop corresponding to the bit position.

4. The semiconductor memory device of claim 2, wherein, when the random number sequence is generated using the first value, the second value, and frequency of access to a destination address value in the semiconductor memory to which the data is to be stored:
the coefficient selecting circuit selects, on the basis of the first value and a third value, one of coefficient groups greater in number than a number of the plurality of first coefficient groups, and outputs the selected one of coefficient groups, the third value being generated from a group of bits of the frequency of access; and
the bit selecting circuit selects, on the basis of the second value and a fourth value, one of selection patterns greater in number than a number of the plurality of selection patterns, and selects N bits in accordance with the selected pattern, and outputs a random number sequence, the fourth value being generated from, among the frequency of access, a group of bits different from the group of bits from which the third value is generated.

5. The semiconductor memory device of claim 2, wherein:
the coefficient selecting circuit includes a first selector and a second selector;
the first selector, when the generation of the random number sequence in the random number generator is started, selects, on the basis of the first value, one of the plurality of first coefficient groups for activating or deactivating the feedback loop, and outputs the selected one of the plurality of first coefficient groups to the second selector, the first value being generated from the group of bits of the address value of the data to be randomized by the random number sequence; and
the second selector, when the generation of the random number sequence in the random number generator is started, outputs the first coefficient input from the first selector to the random number generator, and when the generation of the random number sequence in the random number generator is continued, outputs the second coefficient to the random number generator.

6. The semiconductor memory device of claim 1, wherein, when a bit position with a value of 0 exists in both the first coefficient and the second coefficient, the random number generator does not set the feedback loop corresponding to the bit position.

7. The semiconductor memory device of claim 1, wherein, when the random number sequence is generated using the first value, the second value, and frequency of access to a destination address value in the semiconductor memory to which the data is to be stored,
the coefficient selecting circuit selects, on the basis of the first value and a third value, one of coefficient groups greater in number than a number of the plurality of first coefficient groups, and outputs the selected one of coefficient groups, the third value being generated from a group of bits of the frequency of access, and
the bit selecting circuit selects, on the basis of the second value and a fourth value, one of selection patterns greater in number than a number of the plurality of selection patterns and selects N bits in accordance with the selected pattern, and outputs a random number sequence, the fourth value being generated from, among the frequency of access, a group of bits different from the group of bits from which the third value is generated.

8. The semiconductor memory device of claim 1, wherein:
the coefficient selecting circuit includes a first selector and a second selector;
the first selector, when the generation of the random number sequence in the random number generator is started, selects, on the basis of the first value, one of the plurality of first coefficient groups for activating or deactivating the feedback loop, and outputs the selected one of the plurality of first coefficient groups to the second selector, the first value being generated from the group of bits of the address value of the data to be randomized by the random number sequence; and
the second selector, when the generation of the random number sequence in the random number generator is started, outputs the first coefficient input from the first selector to the random number generator, and when the generation of the random number sequence in the random number generator is continued, outputs the second coefficient to the random number generator.

9. A random number generating circuit comprising:
a random number generator including M (M is a positive integer) number of shift registers, having a feedback loop for a part of the M shift registers, and generating an M-bit random number sequence;
a coefficient selecting circuit that, when generation of the random number sequence in the random number generator is started, selects, on the basis of a first value, one of a plurality of first coefficient groups for activating or deactivating the feedback loop and outputs the selected one of the plurality of first coefficient groups as a first coefficient to the random number generator, and that, when the generation of the random number sequence in the random number generator is continued, outputs a second coefficient different from the first coefficient, the second coefficient being for activating or deactivating the feedback loop, the first value being generated from a group of bits of the address value of the data to be stored in the semiconductor memory; and
a bit selecting circuit that selects one of a plurality of selection patterns on the basis of a second value that is generated from, among the address value of the data to be stored in the semiconductor memory, a group of bits different from the group of bits from which the first value is generated, and that outputs a random number sequence obtained by selecting N (N is a positive integer satisfying M≥N) bits from the M-bit random number sequence output from the random number generator in accordance with the selected selection pattern.

10. The random number generating circuit of claim 9, wherein:
the first value is a value that is generated, when a number of the first coefficient groups is two to an X-th power (X is a positive integer), using an X number of bits among the address value of the data; and
the second value is a value that is generated, when a number of the second coefficient groups is two to a Y-th power (Y is a positive integer), using a Y number of bits among the address value of the data, the Y number of bits being different from the X number of bits.

11. The random number generating circuit of claim 10, wherein, when a bit position with a value of 0 exists in both the first coefficient and the second coefficient, the random number generator does not set the feedback loop corresponding to the bit position.

12. The random number generating circuit of claim 10, wherein, when the random number sequence is generated using the first value, the second value, and frequency of access to a destination address value in the semiconductor memory to which the data is to be stored:
the coefficient selecting circuit selects, on the basis of the first value and a third value, one of coefficient groups greater in number than a number of the plurality of first coefficient groups, and outputs the selected one of coefficient groups, the third value being generated from a group of bits of the frequency of access; and
the bit selecting circuit selects, on the basis of the second value and a fourth value, one of selection patterns greater in number than a number of the plurality of selection patterns, and selects N bits in accordance with the selected pattern, and outputs a random number sequence, the fourth value being generated from, among the frequency of access, a group of bits different from the group of bits from which the third value is generated.

13. The random number generating circuit of to claim 10, wherein:
the coefficient selecting circuit includes a first selector and a second selector;
the first selector, when the generation of the random number sequence in the random number generator is started, selects, on the basis of the first value, one of the plurality of first coefficient groups for activating or deactivating the feedback loop, and outputs the selected one of the plurality of first coefficient groups to the second selector, the first value being generated from the group of bits of the address value of the data to be randomized by the random number sequence; and
the second selector, when the generation of the random number sequence in the random number generator is started, outputs the first coefficient input from the first selector to the random number generator, and when the generation of the random number sequence in the random number generator is continued, outputs the second coefficient to the random number generator.

14. The random number generating circuit of claim 9, wherein, when a bit position with a value of 0 exists in both the first coefficient and the second coefficient, the random number generator does not set the feedback loop corresponding to the bit position.

15. The random number generating circuit of claim 9, wherein, when the random number sequence is generated using the first value, the second value, and frequency of access to a destination address value in the semiconductor memory to which the data is to be stored:
the coefficient selecting circuit selects, on the basis of the first value and a third value, one of coefficient groups greater in number than a number of the plurality of first coefficient groups, and outputs the selected one of coefficient groups, the third value being generated from a group of bits of the frequency of access; and
the bit selecting circuit selects, on the basis of the second value and a fourth value, one of selection patterns greater in number than a number of the plurality of selection patterns, and selects N bits in accordance with the selected pattern, and outputs a random number sequence, the fourth value being generated from, among the frequency of access, a group of bits different from the group of bits from which the third value is generated.

16. The random number generating circuit of claim 9, wherein:
the coefficient selecting circuit includes a first selector and a second selector;
the first selector, when the generation of the random number sequence in the random number generator is started, selects, on the basis of the first value, one of the plurality of first coefficient groups for activating or deactivating the feedback loop, and outputs the selected one of the plurality of first coefficient groups to the second selector, the first value being generated from the group of bits of the address value of the data to be randomized by the random number sequence; and
the second selector, when the generation of the random number sequence in the random number generator is started, outputs the first coefficient input from the first selector to the random number generator, and when the generation of the random number sequence in the random number generator is continued, outputs the second coefficient to the random number generator.

* * * * *